Aug. 23, 1960 E. L. CLOUGH 2,949,690
SAFETY FISH HOOK
Filed Nov. 22, 1957

INVENTOR.
EDWARD L. CLOUGH
Edward L. Clough

United States Patent Office 2,949,690
Patented Aug. 23, 1960

2,949,690

SAFETY FISH HOOK

Edward L. Clough, San Diego, Calif., assignor of one-half to Paul L. Hewey, San Diego, Calif.

Filed Nov. 22, 1957, Ser. No. 698,275

3 Claims. (Cl. 43—36)

This invention relates to fishing apparatus and more particularly to a safety fish hook.

It is an object of the present invention to provide a fish hook assembly having at least a pair of associated hook members which atuomatically spread apart as the fish is hooked to prevent the fish from escaping.

Another object of the present invention is to provide a fishing device of the above type in which the hooks continue to spread apart as the device is pulled by the fish, and in which the hooks are spread apart in relation to the amount the fish opens its mouth when it is caught.

Other objects of the invention are to provide a fish hook device bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
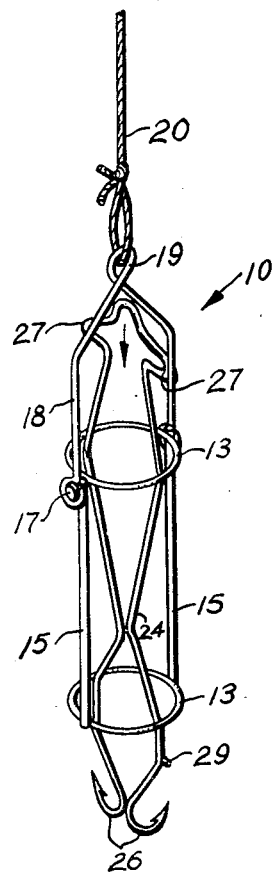
Figure 1 is a perspective view of a fish hook device made in accordance with the present invention in a normally closed position.
Figure 2:
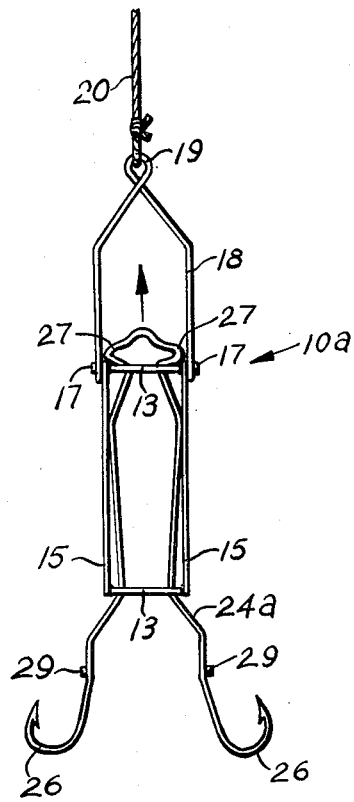
Figure 2 is a view similar to Figure 1, showing the parts in an extended operative position that it assumes when the fish is caught.

Referring now more in detail to the drawing, a fishing device 10 made in accordance with the present invention is shown to include a cylindrical cage that is constructed from a pair of similar rings 13 secured in spaced apart concentric relationship by means of a pair of longitudinally extending stringers 15. The upper one of these rings 13 is provided with a pair of diametrically opposite pintles for rotatably receiving the free ends of an inverted bail 18 that has a centrally located eye 19 for releasable engagement with the line 20.

At least one hook member 24 which is of inverted U-shaped construction is slidably disposed within the cage for reciprocating longitudinal movement. This hook member 24 is provided with a pair of outwardly directed hooks 26 at the free ends thereof which are in a normally adjacent position when the hook member 24 is in the normal retracted position shown in Figure 1. Outwardly extending stops 29 permit the inward movement of the hook member, while outwardly directed shoulders 27 formed at the base of the inverted hook member 24 overlie the upper ring 13 and limit the extended movement of the hook member.

In actual use, the hooks are moved to the retracted position as shown in Figure 1, wherein the hook member 24 is substantially completely confined within the cage member formed by the rings and stringers. However, in response to a pull upon the hook member 24 by a fish biting upon the hooks 26, the hook member 24 is automatically movable to the extended position 24a, wherein the hooks 26 are spread apart so as to more firmly grip the mouth of the fish. In the extended position, the shoulders 27 prevent the parts from being disassembled. After the fish has been caught, it is only necessary to return the hook member to the normally retracted position 24 as shown in Figure 1, following which the device may be used again.

Figure 3:
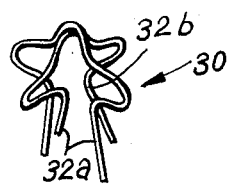
Figure 3 is a fragmentary perspective view of a slightly modified form of construction.

In Figure 3 of the drawing, a slightly modified form of construction 30 is shown wherein a pair of inverted U-shaped hook members 32a, b are used so that a total of four hooks are operative to grip the mouth of the fish that is caught. If desired, a metal or plastic covering may be applied to the cage member so as to provide a more attractive and neat appearance which might be more appealing to the fish and the sportsman alike. The eye 19 of the inverted bail 18 is such that the line 20 can be readily assembled without having to disassemble the fishing device.

While various changes may be made in the detail construction, it shall be understood that such changes shall be within the spirit and scope of the present invention as defined by the appended claims.

What I claim as new and desire to protect by Letters Patent of the United States is:

1. A safety fish hook comprising, in combination, a cage, hook means slidably supported within said cage for longitudinal movement between a retracted and an extended position, and means for limiting said movement of said hook means, said cage being composed of an upper unit and a lower unit pivotally connected to each other, said upper unit being composed of an inverted U-shaped wire bail member with a centrally located eye at the upper and closed end thereof, the free ends of said wire bail member having eyelets formed therein, said lower unit being composed of an upper wire ring and a lower wire ring spaced apart by a pair of longitudinally extending wire stringers, said upper ring being provided with a pair of diametrically opposite pintles for rotatably receiving said eyelets thereon, whereby said lower unit is pivotally secured to said upper unit to effect free swinging movement to the lower unit, said hook means comprising an inverted one piece wire U-shaped member having oppositely outwardly directed hooks secured therewith at the lower free ends thereof, and said hooks being spring biased away from each other as said member slides partially outwardly through said lower ring of said lower unit of said cage, and said hooks being movable towards each other by said lower ring during retracted movement thereof within said cage.

2. The combination according to claim 1, wherein said movement limiting means comprises a pair of laterally outwardly extending shoulders at the base end of said U-shaped member extending outwardly from said one end of said cage of greater combined length than the diameter of said cage for limiting said extending movement.

3. The combination according to claim 2, wherein said limiting means further comprises outwardly extending stop secured adjacent to said hooks for engagement with said lower ring at the lower end of said cage for limiting said retracting movement.

References Cited in the file of this patent

UNITED STATES PATENTS

| | | |
|---|---|---|
| 1,246,150 | Parr | Nov. 13, 1917 |
| 1,259,390 | Gilbert | Mar. 12, 1918 |

FOREIGN PATENTS

| | | |
|---|---|---|
| 920,581 | Germany | Nov. 25, 1954 |